United States Patent

[11] 3,627,635

[72] Inventors Bart Allan Smith;
James L. Lass, both of San Jose, Calif.
[21] Appl. No. 761,777
[22] Filed Sept. 23, 1968
[45] Patented Dec. 14, 1971
[73] Assignee General Electric Company

[54] NUCLEAR FUEL RETAINER
13 Claims, 3 Drawing Figs.

[52] U.S. Cl. ........................................... 176/68,
176/79
[51] Int. Cl. ....................................... G21c 3/18
[50] Field of Search ............................ 176/79, 67,
68, 37, 73

[56] References Cited
UNITED STATES PATENTS
2,952,603 9/1960 Boller et al. .................. 176/79
3,141,830 7/1964 Klepper et al. ............... 176/68
3,180,804 4/1965 Flora et al. .................... 176/79
3,189,101 6/1965 Blake ............................ 176/79 X
3,238,108 3/1966 Deddens et al. ............... 176/68
3,331,749 7/1967 Anthony et al. ............... 176/79
3,357,893 12/1967 Gatley et al. .................. 176/68
3,378,458 4/1968 Ross et al. ..................... 176/79
3,392,438 7/1968 Coulter et al. ................. 176/79 X
3,406,094 10/1968 Beisswenger et al. ......... 176/79

Primary Examiner—Carl D. Quarforth
Assistant Examiner—Gary G. Solyst
Attorneys—Ivor J. James, Jr., Samuel E. Turner, John R. Duncan, Frank L. Neuhauser, Oscar B. Waddell and Melvin M. Goldenberg ABSTRACT: A resilient cup-shaped retainer for preventing displacement of the fuel into the fission gas plenum of a nuclear reactor fuel element.

PATENTED DEC 14 1971

3,627,635

INVENTORS:
BART A. SMITH
JAMES L. LASS

BY: Samuel E. Turner

ATTORNEY

NUCLEAR FUEL RETAINER

The release of large amounts of energy through nuclear fission reactions is now well known. Briefly, a fissile atom, such as U-235, absorbs a neutron it its nucleus and undergoes a nuclear disintegration which produces fission products of lower atomic weight with great kinetic energy and several neutrons also of high energy. The kinetic energy of the fission products is dissipated as heat in the nuclear fuel. This heat may be removed by passing a coolant in heat exchange relation to the fuel and the heat then may be extracted from the coolant to perform useful work.

In a known type of reactor, for example, as used in the Dresden Nuclear Power Station near Chicago, Ill., the reactor core is of the heterogeneous type. That is, the nuclear fuel is in the form of elongated cladded rods. These fuel rods or elements are grouped together and contained in open-ended tubular flow channels to form separately removable fuel assemblies or bundles. A sufficient number of fuel assemblies are arranged in a matrix, approximating a right circular cylinder, to form the nuclear reactor core capable of self-sustained fission reaction. The core is submersed in a fluid, such as light water, which serves both as a coolant and as a neutron moderator.

Typically, the above-mentioned fuel rods or elements are formed of a sealed tube containing the nuclear fuel, for example in the form of a plurality of cylindrical fuel pellets, as shown, for example, by J. L. Lass et al. in U.S. Pat. No. 3,365,371. The tube, sealed by end plugs, thus serves as a cladding to isolate the nuclear fuel from the moderator-coolant and to prevent the release of fission products.

Some of the fission products are gases. To accommodate and contain these fission product gases it is known, as shown in the above-mentioned U.S. Pat. No. 3,365,371, to provide a space or plenum in the fuel element which is not occupied by the nuclear fuel. The provision of this space or plenum creates the problem of retaining the fuel in its desired position. For proper nuclear performance, it is important that the fuel be in a specified active fuel zone of the reactor core. It is found that unretained fuel may shift in the fuel element, especially during handling and shipping when the fuel element may be in other than a vertical position. It is further found that the shifted fuel may cock or wedge against the fuel tube so that it does not return to the active fuel zone when the fuel element is loaded into the core.

Various means, such as cylindrical sleeves, dished washers and coil springs, are shown in the prior art for retaining the fuel column in its desired position.

Dished shaped disks or washers are shown by F. Kerze, Jr. In U.S. Pat. No. 3,230,152. The disks are designed to wedge against the inside of the cladding tube. Such fuel retainers do not provide for axial expansion of the fuel column during reactor operation and they are difficult to insert properly.

A coil spring type of fuel column retainer is shown by W. T. Ross et al. in U.S. Pat. No. 3,378,458. While such a spring is effective in retaining the fuel column and providing for axial expansion of the fuel, it is wasteful of plenum volume. For example, in a typical case such a spring occupies about 12-15 percent of the plenum volume. The coil spring retainer also presents a problem of contamination of the end plug weld as mentioned in the Ross et al. patent.

A cylindrical sleeve retainer presents all of the disadvantages mentioned above.

An object of this invention is to provide a fuel retainer which substantially overcomes the aforementioned disadvantages.

Another object of the invention is to provide a simple, effective and reliable fuel retainer.

These and other objects of the invention are achieved by providing a fuel retainer having the form of a split cup which provides a lateral force against the inside of the fuel element cladding the tube sufficient to retain the fuel column during handling and shipment but which permits axial expansion of the fuel column during reactor operation.

The invention is described more specifically hereinafter with reference to the accompanying drawing wherein.

Figure 1:
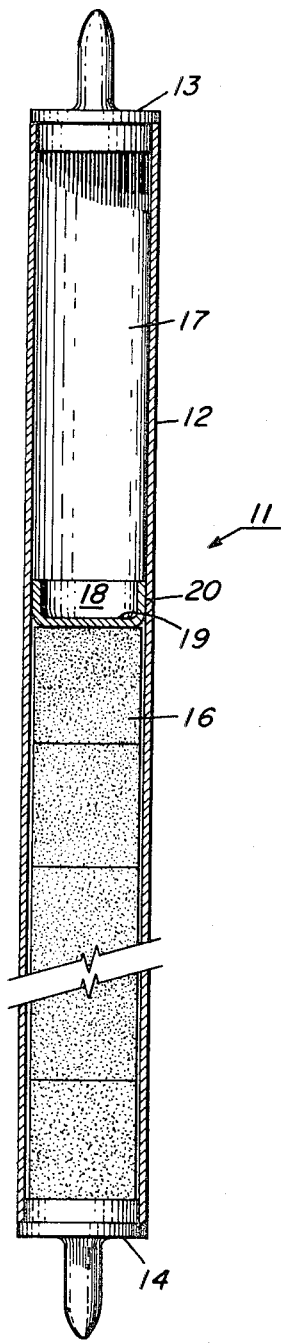
FIG. 1 is a longitudinal cross section view of a fuel element incorporating the fuel retainer of the present invention.

Shown in FIG. 1 is a typical fuel element 11 including an elongated cladding tube 12. The tube 12 is formed of a suitable material for use in a reactor such as stainless steel, aluminum or zirconium. Zirconium is a preferred material because of its low neutron capture cross section. The ends of the cladding tube 12 are sealed by end plugs 13 and 14 which are welded or otherwise fused to the tube to prevent entry of the coolant moderator and to prevent escape of fission products. Contained within the cladding tube 12 is a column of nuclear fuel 16 such as uranium dioxide which may be in the form of pellets placed end to end in the tube.

The cladding tube 12 is not completely filled with nuclear fuel. Instead, a space or plenum 17 is provided to collect the fission product gases produced during reactor operation. The volume of the plenum 17 is made large enough to accommodate at reasonable pressure the fission product gases expected to be released by the fuel during its life in the reactor core.

To retain the fuel column 16 in position, especially during handling and shipping, there is provided in accordance with the present invention a cup-shaped fuel retainer 18 between the fuel column 16 and the plenum 17. The retainer 18 is formed of a suitable spring material, such as Inconel-X of, for example, about 0.03 of an inch in thickness, and includes a bottom portion 19 and an upstanding portion 20. The upstanding portion 20 is formed to provide a friction force or bias against the inside wall of tube 12 sufficient to resist displacement of the retainer 18 during all normal handling and shipping operations but which permits upward displacement of the retainer 18 by the forces of axial (longitudinal) expansion of the fuel column 16 during reactor operation. The longitudinal length of the upstanding portion 20 is made long enough, consistent with minimizing the amount of retainer material, to provide for easy insertion of the retainer into the cladding tube 12 and seating against the fuel column 16 without cocking or wedging. A length of at least one-quarter and preferably about one-half the diameter of the bottom portion 19 is found suitable.

Figure 2:
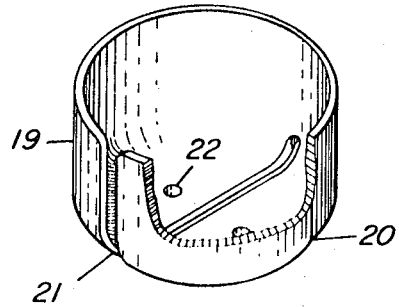
FIG. 2 is a partly cut away perspective view of an embodiment of a fuel retainer in accordance with the invention.

A specific embodiment of the fuel retainer 18 is shown in FIG. 2. In this embodiment the cup-shaped retainer is split by a slot 21 which extends through one side of the upstanding portion 20 and across the bottom portion 19. Such a split cup retainer provides an advantage over the plain cup form in that the spring force is more constant over larger changes in diameter. Holes 22 may be provided in the bottom portion 19 to aid passage of the fission gases from the fuel into the plenum 17 and to receive a tool for removing the retainer 18 from the tube 12.

Figure 3:
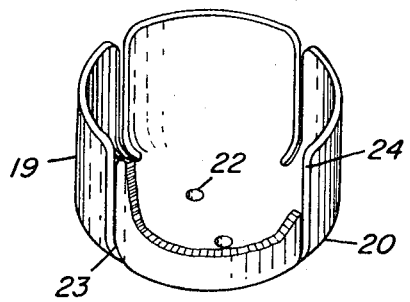
FIG. 3 is a partly cut away perspective view of an alternative embodiment of a fuel retainer in accordance with the invention.

Another embodiment of the fuel retainer 18 is shown in FIG. 3. In this embodiment the cup-shaped retainer is formed with two pairs of opposed longitudinal slots. A first pair of opposed slots 23 are formed in the bottom upstanding portion 20 and they also extend slightly into the bottom portion 19. A similar second pair of opposed slots 24 are formed in the upstanding portion 20 to about 90° from the slots 23.

Thus the fuel retainer of the present invention provides at least the following advantages: The present fuel retainer occupies less than 1 percent of the plenum volume as compared to about 12-15 percent of the plenum volume required of the prior coil spring and cylindrical sleeve retainers. The present fuel retainer is simple and inexpensive to manufacture. The present fuel retainer is self-aligning to provide easy, accurate installation in the cladding tube. The present fuel retainer avoids the constant pressure against the end plugs attendant the use of a coil spring and the problems of welding the upper end plug to the cladding tube in the presence of this pressure.

The present fuel retainer also serves as a thermal barrier between the fuel column and the gas in the plenum with a minimum of mass-to-surface area available as a source of gamma heating of the fission product gases-less heating of the gases provides a reduction in gas pressure or allows a reduction in plenum volume. Since the present fuel retainer is remote from the end of the cladding tube, there is no interference with or possible contamination of the tube-end plug weld as in the case of sleeve and coil spring retainers. Where the cladding tube is formed of nonmagnetic material, the axial position of the present fuel retainer can be checked without costly radiography simply with a magnet. Since the bottom portion of the present fuel retainer is substantially flat, no additional disk or washer is needed to distribute the stresses of the fuel against the retainer as is usually required when coil springs, sleeves or dished washer retainers are used.

Thus what has been described is an improved structure for retaining the fuel in its required position in a fuel element. While illustrative embodiments of the invention have been described herein, modifications and adaptations thereof may be made by those skilled in the art without departure from the spirit and scope of the invention as defined by the following claims.

We claim:

1. In a nuclear reactor fuel element formed of an elongated tube containing nuclear fuel and a space for accumulating fission product gases, the improvement comprising a cup-shaped retainer between said nuclear fuel and said space, said retainer having a bottom portion transverse of said tube and an upstanding portion frictionally engaging said tube whereby axial movement of said fuel is resisted, said frictional engagement constituting the sole engagement of said retainer with said tube, and means forming a passage for said gases from said fuel to said space.

2. The fuel element according to claim 1 wherein the frictional force of said retainer is sufficient to prevent displacement of said fuel during shipping and handling operations.

3. The fuel element of claim 2 wherein said frictional force is such allow axial displacement of said retainer in response to longitudinal expansion of said nuclear fuel during operation in said reactor.

4. The fuel element according to claim 1 wherein said bottom portion of said retainer includes at least one opening for passage of gases from said fuel to said space.

5. The fuel element according to claim 1 wherein said cup-shaped retainer is partly split.

6. The fuel element of claim 5 wherein said split is formed by a slot longitudinally through said upstanding portion of said retainer and extending across the bottom portion of said retainer.

7. The fuel element of claim 5 wherein said split is formed by two pairs of opposed slots in said retainer, a first of said pair of slots extending longitudinally through said upstanding portion and the second of said pair of slots spaced radially from said first pair of slots and extending longitudinally through said upstanding portion.

8. The fuel element according to claim 1 wherein the longitudinal length of said upstanding portion is at least equal to one-quarter of the diameter of said bottom portion.

9. In a nuclear reactor fuel element formed of a sealed container for a column of nuclear fuel and including a plenum for accumulating fission product gases, a fuel retainer between said column and said plenum formed of a bottom portion transverse of said container and an upstanding portion frictionally engaging said container, said frictional engagement constituting the sole engagement of said retainer with said container, and means forming a passage for said gases from said fuel to said plenum.

10. The fuel element of claim 9 wherein the friction force between said retainer and said container is at least sufficient to support the weight of said column of nuclear fuel but is insufficient to prevent displacement of said retainer by expansion of said fuel during operation in said reactor.

11. A nuclear reactor fuel element comprising a cladding tube containing a column of nuclear fuel and a plenum for accumulating gases, a fuel retainer between said column of fuel and said plenum, said retainer including a substantially flat circular portion transverse of said tube and a substantially cylindrical upstanding portion frictionally engaging said tube, said frictionally engagement constituting the sole engagement of said retainer with said tube, and means forming a passage for said gases from said fuel to said plenum.

12. The fuel element of claim 11 wherein said flat circular portion and said cylindrical upstanding portion are joined by a curved portion.

13. The fuel element of claim 11 wherein said upstanding portion of said retainer is formed with at least one longitudinally extending slot.

* * * * *